United States Patent
Cheng et al.

(10) Patent No.: US 9,206,285 B2
(45) Date of Patent: Dec. 8, 2015

(54) PHOTONIC CRYSTAL, CONJUGATED POLYMERS SUITABLE FOR PHOTONIC CRYSTALS, AND A METHOD FOR SYNTHESIZING CONJUGATED POLYMERS

(75) Inventors: Stephen Z. Cheng, Richfield, OH (US); Matthew J. Graham, Akron, OH (US); Frank W. Harris, Boca Raton, FL (US); Shi Jin, Staten Island, NY (US)

(73) Assignee: The University of Akron, Akron, OH (US)

( * ) Notice: Subject to any disclaimer, the term of this patent is extended or adjusted under 35 U.S.C. 154(b) by 658 days.

(21) Appl. No.: 13/562,773

(22) Filed: Jul. 31, 2012

(65) Prior Publication Data

US 2012/0296060 A1 Nov. 22, 2012

Related U.S. Application Data

(62) Division of application No. 11/573,694, filed as application No. PCT/US2005/029498 on Aug. 19, 2005, now Pat. No. 8,257,493.

(60) Provisional application No. 60/602,810, filed on Aug. 19, 2004.

(51) Int. Cl.
*C30B 29/54* (2006.01)
*C30B 29/58* (2006.01)
(Continued)

(52) U.S. Cl.
CPC ............... *C08G 61/126* (2013.01); *B82Y 20/00* (2013.01); *C08G 61/124* (2013.01);
(Continued)

(58) Field of Classification Search
CPC .......... C30B 29/54; C30B 29/58; C30B 29/64
See application file for complete search history.

(56) References Cited

U.S. PATENT DOCUMENTS

2002/0009277 A1* 1/2002 Noda et al. ..................... 385/130
2005/0196118 A1* 9/2005 Ikemoto et al. ............... 385/129

FOREIGN PATENT DOCUMENTS

GB 2 356 713 A 5/2001
WO 02/33461 A2 4/2002

OTHER PUBLICATIONS

Shi Jin et al., "Anisotropic Polythiophene Films with High Conductivity and Good Mechanical Properties via a New Electrochemical Synthesis", Advanced Materials, Oct. 16, 2002, pp. 1492-1496, vol. 14, No. 20.

(Continued)

*Primary Examiner* — Robert M Kunemund
(74) *Attorney, Agent, or Firm* — Renner, Kenner Greive, Bobak Taylor and Weber

(57) ABSTRACT

The present invention relates to conjugated polymers and a method for their synthesis. Furthermore, the present invention relates to electro-synthesis methods for producing polymers that include the use of at least one Lewis acid and at least one proton trap to form organic conjugated polymers having elevated refractive indices. In one embodiment, the present invention relates to an organic polymer having an elevated refractive index, the organic polymer formed by a process comprising the steps of: providing a solution of unsaturated organic monomer units and at least one acidic component; impeding saturation of the unsaturated organic-monomer units by at least one protic element in the solution; and polymerizing the unsaturated organic monomer units to form a conjugated organic polymer having a refractive index of at least about 2.3 for electromagnetic energy having a wavelength of about 700 nm.

11 Claims, 2 Drawing Sheets

(51) Int. Cl.
*C30B 29/64* (2006.01)
*C08G 61/12* (2006.01)
*B82Y 20/00* (2011.01)
*G02B 6/122* (2006.01)

(52) U.S. Cl.
CPC ........... *C08G 61/125* (2013.01); *G02B 6/1225* (2013.01); *C08G 2261/3221* (2013.01); *C08G 2261/3222* (2013.01); *C08G 2261/3223* (2013.01)

(56) References Cited

OTHER PUBLICATIONS

Matthew Graham et al., "Synthesis and Characterization of High Performance Poly(thiophene)", Polymer Preprints (American Chemical Society, Division of Polymer Chemistry), 2004, 45(2), pp. 667-668, XP009124334, ISSN: 00332-3934.

Matthew J. Graham, "Development of High Refractive Index Poly(thiophene) for the Fabrication of All Organic 3-D Photonic Materials with a Complete Photonic Band Gap", Dec. 1, 2012, pp. 79-114, Retrieved from the Internet: URL:http://etd.ohiolink.edu/send-pdf.cgi/Graham%20Matthew.pdf?akron1164049666 [retrieved on Dec. 17, 2012].

Andrew Hamnett et al, "An Ellipsometric Study of the Nucleation and Growth of Polythiophene Films", Journal of the Electrochemical Society, ECS, vol. 135, No. 10, Oct. 1, 1988, pp. 2517-2524, XP008122741, ISSN: 0013-4651, DOI: 10.1149/1.2095368.

Database CA [Online] Chemical Abstracts Service, Columbus, Ohio, US; Oct. 3, 2003, Yokoo, Atsushi et al., "Two dimensional photo nick crystal laser and two dimensional photo nick crystal laser manufacturing method [Machine Translation].", retrieved fro STN Database accession No. 2003:774434 ; -% b) JP 2003 283014 A (Nippon Telegraph and Telephone Corp., Japan) Oct. 3, 2003.

Deutsch M. et al., "Conjugated-Polymer Photonic Crystals", Advanced Materials, Wiley VCH Verlag, DE, vol. 12, No. 16, Aug. 16, 2000, pp. 1176-1180, XP000963582, ISSN: 0935-0648, DOI: 10.1002/1521-4095(200008) 12:16 1176::AID-ADMA11763.0.CO;2-H.

Allard D. et al., "Micro- and nanostructuring of oligo- and polythiophenes in two and three dimensions", Electrochimica Acta, Elesevier Science Publishers, Barking, GB, vol. 48, No. 20-22, Sep. 30, 2003, pp. 3137-3146, XP004447011, ISSN: 0013-4686, DOI: 10.1016/S0013-4686(03) 00343-8.

Satoh S. et al., "Temperature and voltage dependent optical properties of conducting polymer in synthetic opal as photonic crystal", Synthetic Metals, Elsevier Sequoia, Lausanne, CH, vol. 121, No. 1-3, Jan. 1, 2001, pp. 1503-1504, XP002269753, ISSN: 0379-6779, DOI: 10.1016/S0379-6779(00) 01093-6.

\* cited by examiner

PHOTONIC CRYSTAL, CONJUGATED POLYMERS SUITABLE FOR PHOTONIC CRYSTALS, AND A METHOD FOR SYNTHESIZING CONJUGATED POLYMERS

CROSS-REFERENCE TO RELATED APPLICATION

This is a divisional application of U.S. patent application Ser. No. 11/573,694, filed Aug. 17, 2007, now U.S. Pat. No. 8,257,493, which is the National Stage of International Application No. PCT/US2005/29498 filed on Aug. 19, 2005, which claims the benefit of U.S. Provisional Application No. 60/602,810 filed Aug. 19, 2004, the contents of which are incorporated herein by reference.

FIELD OF THE INVENTION

The present invention relates to conjugated polymers and a method for their synthesis. Furthermore, the present invention relates to electro-synthesis methods for producing polymers that include the use of at least one Lewis acid and at least one proton trap to form organic conjugated polymers having elevated refractive indices.

BACKGROUND OF THE INVENTION

Conventional integrated circuits transmit signals by conducting electrons through semiconducting materials. In a pure silicon crystal, for example, the silicon atoms are arranged in a highly-ordered lattice structure. Electrons moving through this lattice experience periodic potentials as they interact with the silicon nuclei, resulting in the formation of a band gap between a conduction band and a valence band. Since no electrons will have an energy in the band gap of pure silicon crystals, the silicon is doped with suitable impurities to disrupt the periodicity of the crystal lattice. The doping of the silicon crystal can give rise to the absence of a silicon atom or the presence of an impurity at a silicon site in the lattice, or an impurity atom located at a non-silicon site within the lattice structure. In this way, electrons are permitted to have an energy within the band gap, thereby minimizing the size of the energy gap that electrons must surmount in order to make the transition from the valence band to the conduction band, and improving the overall conductivity of the silicon crystal.

The field of photonics aims to develop circuitry that harnesses light to transmit signals and supersede in function the utilities currently carried out by electrons. For example, a photonic crystal can include a block of dielectric transparent material having air holes interspersed throughout said material. The refractive index of the dielectric material is large relative to the refractive index of the air. Photons passing through the block of dielectric material will periodically encounter regions of high refractive index and low refractive index in a manner analogous to electrons periodically encountering allowable energy ranges and the band gap as they pass through a silicon crystal. A large contrast between the refractive index of the dielectric material and the air holes causes most of the light passing through the photonic crystal to be confined within the dielectric material, essentially forming an allowable energy region separated by forbidden energy regions, which are commonly referred to as the photonic band gap. Just as it is possible to create allowable energy levels in the band gap of silicon crystals, it is also possible to create allowable energy levels within the photonic band gap by altering the size of some of the air holes interspersed through the dielectric material.

Though photonics is theoretically sound, there are practical obstacles preventing its widespread application. The construction of photonic crystals requires regular fine features on the length scale of hundreds of nanometers formed with materials having a high refractive index relative to that of air. Photonic crystals made with semiconducting materials and processing methods have been considered for development of photonic crystals. Although semiconducting materials and their processing methods can be used to manufacture regular structures having high refractive indices, the materials have only a limited set of physical properties, and the conventional processing methods for such materials are capital intensive.

Polymeric materials have been proposed for use in the construction of photonic crystals to both expand the physical properties of such devices and reduce the capital requirements in their production. Unlike photonic crystals manufactured from semiconducting materials, however, photonic crystals made from polymeric materials possess a relatively low refractive index contrast, which is usually the ratio of the refractive index of the polymeric material to the refractive index of the air. Typically, organic materials have a refractive index of 1.3 to 1.7, which is lower than desired for photonic crystal fabrication.

It has been proposed that certain conjugated organic polymers, such as polythiophene ("PT"), could be synthesized with a high refractive index of about 1.7, but experimental tests disclosed in A. Hamnett and A. R. Hillman of the *J. Electrochem Soc.* 1988, 135, 2517, revealed that the refractive index of polythiophene was actually 1.4. It was hypothesized that the lower-than-expected refractive index was caused by what is referred to as the "Polythiophene Paradox." This paradox arises because polythiophene (PT) is electrosynthesized and the potential required to polymerize the starting material is greater than the potential required to degrade the resultant polymer. This results in a highly degraded polymer with very low levels of conjugation.

Thus, there is a need in the art for organic polymers having elevated indices of refraction and for methods of making such polymers that permit one to obtain elevated indices of refraction.

SUMMARY OF THE INVENTION

The present invention relates to conjugated polymers and a method for their synthesis. Furthermore, the present invention relates to electro-synthesis methods for producing polymers that include the use of at least one Lewis acid and at least one proton trap to form organic conjugated polymers having elevated refractive indices.

In one embodiment, the present invention provides organic materials suitable for the formation of photonic crystals and a method for the synthesis of such materials. One benefit of the present invention is that it permits one to, among other things, minimize the cost of synthesizing organic materials that are suitable for use in photonic crystals. Additionally, the present invention permits the development of a photonic crystal that includes one or more organic materials therein.

The present invention achieves these and other objectives by providing organic conjugated polymers having elevated refractive indices suitable for photonic applications and a photonic crystal fabricated form one or more organic conjugated polymers.

In one embodiment, the present invention relates to an organic polymer having an elevated refractive index, the organic polymer formed by a process comprising the steps of: providing a solution of unsaturated organic monomer units and at least one acidic component;

impeding saturation of the unsaturated organic-monomer units by at least one protic element in the solution; and polymerizing the unsaturated organic monomer units to form a conjugated organic polymer having a refractive index of at least about 2.3 for electromagnetic energy having a wavelength of about 700 nm.

In another embodiment, the present invention relates to an organic polymer comprising a conjugated portion with extensively-delocalized pi-electrons, wherein the organic polymer has a refractive index of at least about 2.3 for electromagnetic energy having a wavelength of about 700 nm.

In still another embodiment, the present invention relates to a photonic crystal comprising: a base region comprising at least one organic material having a refractive index of at least about 2.3 for electromagnetic energy having a wavelength of about 700 nm; and a plurality of secondary regions formed in the base region, the secondary regions comprising a second material, wherein the photonic crystal reflects at least a portion of electromagnetic energy falling within a first range of frequencies and transmits at least a portion of electromagnetic energy falling within a second range of frequencies that is different from the first range of frequencies.

The foregoing and other features and advantages of the present invention will become apparent to those skilled in the art to which the present invention relates upon reading the following description with reference to the accompanying drawings.

DESCRIPTION OF THE INVENTION

Figure 1:
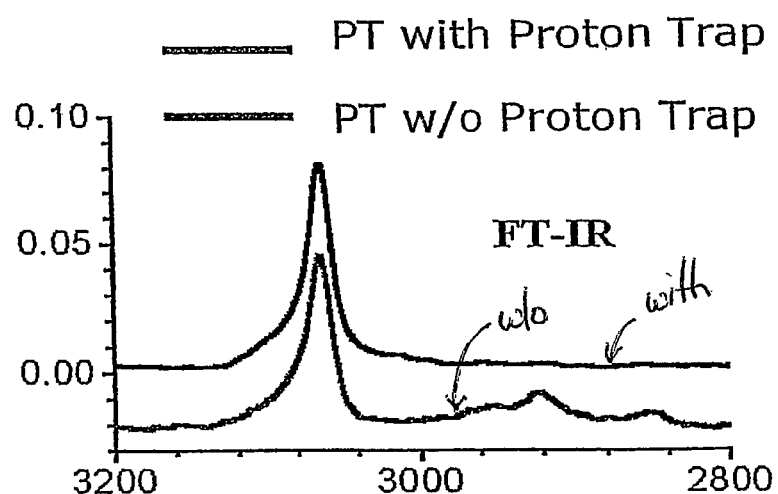
FIG. 1 is a FT-IR plot comparing the incorporation of saturated monomer units into a polymer network with and without the use of a proton trap.

The present invention relates to conjugated polymers and a method for their synthesis. In one instance, the present invention relates to electro-synthesis methods for producing polymers that include the use of at least one Lewis acid and at least one proton trap to form organic conjugated polymers having elevated refractive indices. Additionally, certain terminology is used herein for convenience only and is not to be taken as a limitation on the present invention.

In one embodiment, the present invention includes a conjugated organic polymer having an elevated refractive index suitable for use in the fabrication of a photonic crystal. In such a case, the conjugated organic polymer of the present invention has a refractive index that is greater than about 2.3, greater than about 2.4, greater than about 2.5, greater than about 2.6, greater than about 2.7, greater than about 2.8, greater than about 2.9, and even greater than about 3.0. It should be noted that for purposes of this invention, all of the above-mentioned refractive indices are determined with light having a wavelength of about 700 nm. The present invention further includes a method of synthesizing one or more conjugated organic polymers having suitably high refractive indices for photonic purposes, and a photonic crystal including such organic polymers.

The refractive index of a material is influenced by both its electron density and its polarizability. Electron density is a measure of amount of electrons in a unit volume. Polarization of the material is a related phenomenon whereby the electron distribution of the material is altered from its natural, unbiased state by an electric field. Like charges tend to repel each other while opposite charges tend to generate an attractive force therebetween. The organic polymer of the present invention includes an extensively conjugated path formed from organic monomers to enhance the polarizability of that polymer. An example of a suitable conjugated organic polymer is polythiophene (PT), formed by the method of the present invention and having the following general structure:

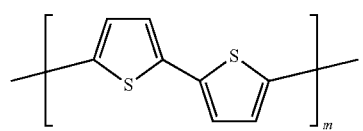

wherein m represents a number of repeated units in the polymer. In one embodiment, m is equal to an integer in the range of about 25 to about 100,000, or from about 50 to about 50,000, or from about 100 to about 25,000, or from about 500 to about 20,000, or from about 1,000 to about 15,000, or from about 1,500 to about 10,000, or from about 2,500 to about 7,500, or even from about 3,500 to about 5,000. In still another embodiment, m is equal to an integer greater that about 1,000, about 2,500, about 5,000, about 10,000, about 15,000, about 20,000, about 40,000, about 50,000, about 75,000, about 100,000, or even about 250,000. Here, as well as elsewhere in the specification and claims, individual range limits may be combined.

In one embodiment, large m values (e.g., those greater than about 1,000, about 2,500, or even about 5,000) are preferred to enhance the properties of polythiophene (PT). In addition to polythiophene (PT), other suitably unsaturated monomers may be polymerized to form the conjugated organic polymers of the present invention. Non-limiting examples of suitable conjugated organic polymers include polypyrrole, polyfuran, polythiophenevinylene and polyphenylenevinylene.

As mentioned above, polythiophene (PT) synthesized according to conventional methods has a refractive index within the range of 1.3 to 1.7, which is common for most organic polymers. In contrast, the method of the present invention results in a conjugated polythiophene (PT) having an elevated refractive index such as those listed above for various preferred embodiments. Synthesis of polythiophene (PT) via electro-polymerization is used herein as an illustrative embodiment without excluding other conjugated organic polymers and other synthesis techniques from the scope of the present invention. A Lewis acid solution is introduced to a solution including the unsaturated thiophene-monomer units, thereby lowering the electric potential required to initiate polymerization of the monomer units to a level below the electric potential at which the resulting polymer experiences substantial degradation. Lewis acids are well known species capable of accepting a pair of electrons and forming a coordinate covalent bond. Non-limiting examples of Lewis acids suitable for purposes of the present invention include boron trifluoro diethyl etherate ("BFEE"), antimony pentafluoride and aluminium trichloride.

The presence of water in the Lewis-acid solution introduces acidic protons that can saturate at least a portion of the thiophene-monomer units and cause these saturated units to be introduced into the resulting polymer. Incorporating the saturated units into the resulting polymer will be detrimental to the degree of conjugation of the polymer. These saturated monomer units affect the refractive index in two ways. First, they impede the mobility of the electrons and accordingly reduce the polarizability of the polymer. Second, the saturated monomer units are not generally planar like the unsaturated units, so incorporation of these saturated monomer units into the polymer results in density-reducing kinks in the polymer. To minimize the saturation of monomer units and their subsequent incorporation into the polymer, one or more proton traps can be added to the solution to scavenge and sequester these acidic protons.

Proton traps are typically bulky species that include a cyclical portion and one or more branches extending from the cyclical portion. Suitable proton traps include, but are not limited to, 2,6-di-tert-butylpyridine ("DTBP"), 2,4,6-tri-tert-butylpyridine ("TTBP1"), and 2,4,6-tri-tert-butylpyrimidine ("TTBP2"), shown as items I, II, and III below, respectively, but any other proton sequestering and scavenging species can be used.

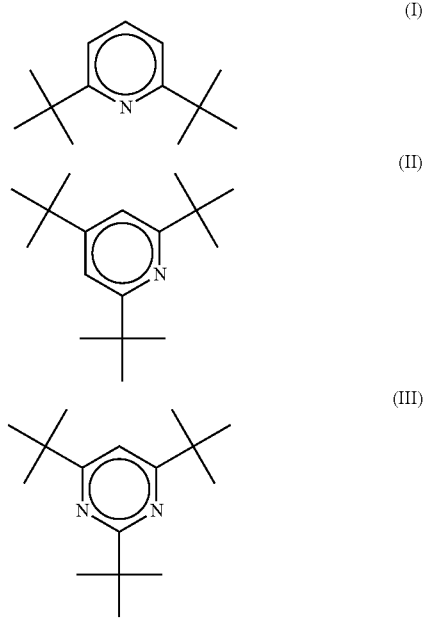

The concentration of the proton trap is optimized to scavenge a substantial portion (e.g., at least about 50%, at least about 60%, at least about 80%, at least about 90%, at least about 95%, or even at least about 99%) of the protic impurities without significantly abstracting protons from the monomer units to impede conjugation. In one embodiment, a suitable proton trap such as DTBP is used at a concentration of about 50 mmol. In another embodiment, a suitable proton trap such as TTBP1 is used at a concentration of about 10 mmol. In still another embodiment, a suitable proton trap such as TTBP2 is used at a concentration of about 10 mmol It should be noted that the present invention is not limited to certain concentrations of proton trap compounds. Rather, any suitable amount of proton trap compound can be utilized in the present invention depending on the conditions under which an organic polymer in accordance with the present invention is synthesized. Some of the conditions that affect the amount of proton trap compound used in the present invention are the nature of the monomer being polymerized via the methods of the present invention, the Lewis acid chosen, the water present in the acidic solution, among other factors. In another embodiment, concentrations of up to 250 mmol can be used, without significant detriment to the resulting polymer.

In one embodiment, the concentration of polythiophene (PT) monomer units is in the range of about 5 mmol to about 100 mmol, or about 10 to about 75 mmol, or even about 25 to about 50 mmol.

Figure 2:
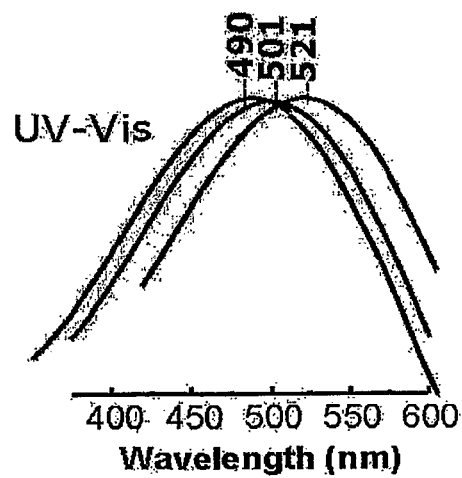
FIG. 2 is a graphical representation of results obtained during a UV-Vis analysis comparing the level of conjugation of the polymer obtained with and without using a proton trap, and when synthesized at reduced temperatures with a proton trap.

Polythiophene (PT) films formed in accordance with the present invention are analyzed using FT-IR and UV-Vis. The FT-IR, shown in FIG. 1, of films produced with and without a proton trap show that the formation and subsequent incorporation of saturated monomer units is minimized by adding at least one proton trap. As a consequence, the absorption peak shown in the UV-Vis spectrum in FIG. 2 is shifted from about 490 nm to about 501 nm. This shift is indicative of an increase in the level of conjugation in the polythiophene (PT) chains.

In an additional embodiment, the method of the present invention involves reducing the run temperature used for the polymerization reaction of the present invention to a temperature near the freezing point of the solvent used in the polymerization reaction. By reducing the synthesis temperature to within approximately 20° C. of the freezing point of a Lewis acid solvent, the UV-Vis spectrum in FIG. 2 is further shifted from 501 nm to 521 nm. This shift is indicative of an increase in the level of conjugation in the polythiophene (PT) chains.

Figure 3:
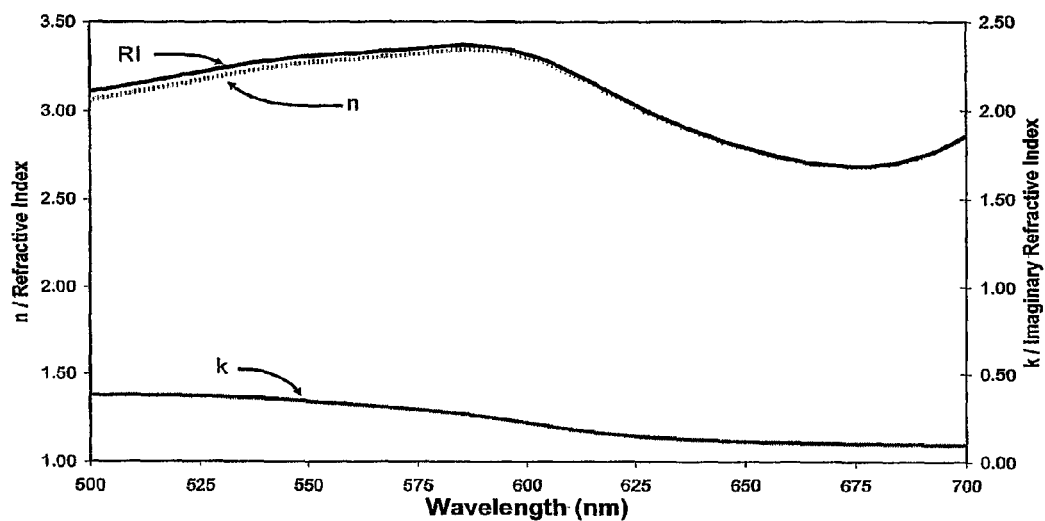
FIG. 3 is a refractive index dispersion curve for a polythiophene (PT) film for electromagnetic energy having wavelengths from about 500 nm to about 700 nm.

The refractive-index dispersion curve for an optically-enhanced polythiophene (PT) film of the present invention was analyzed using a variable-angle spectroscopic ellipsometer. The ellipsometer gives the optical constants for a material which can then be used to determine the material's refractive index. With the ellipsometer, the refractive-index dispersion curve for the optically-enhanced polythiophene (PT) film was generated over a wavelength range from about 500 nm to about 700 nm, as is shown in FIG. 3. In FIG. 3, the curve labeled "Refractive Index" is the complex refractive index, n is the real part of the refractive index, and k is the absorption coefficient. From the refractive-index dispersion curve in FIG. 3, it can be seen that in the wavelength range of 500 to 700 nm the film has a maximum refractive index of about 3.36 occurring at a wavelength of about 585 nm, and refractive indices of about 3.35 occurring at about 589 nm, and about 2.94 occurring at about 633 nm. An organic material having such elevated refractive indices is suitable for use in the fabrication of 3-D photonic crystals with an inverse opal structure, which is the most commonly used structure, for about a 100 nm range of wavelengths.

A photonic crystal is a spatially-periodic dielectric structure that reflects electromagnetic radiation that falls within a range of frequencies and passes electromagnetic radiation that falls outside the range of frequencies. Thus, photonic crystals form photonic band gaps that prevent the propagation of light in a certain frequency range. Generally, a photonic crystal of the present invention includes a base region formed from an organic material having a refractive index of at least about 2.3 for electromagnetic energy having a wavelength of about 700 nm. The organic material of the base includes delocalized pi electrons that can travel along the conjugated portion of the organic material.

Secondary regions are formed in the base region by periodically interspersing any second material in the base region. The second material can be any material that has a refractive index that produces a refractive index contrast of the organic material to the second material of at least about 2.3. In one embodiment, the present invention includes photonic crystals having a refractive index contrast of at least about 2.4, or at least about 2.5, or at least about 2.6, or at least about 2.7, or at least about 2.8, or at least about 2.9, or at least about 3.0, or at least about 3.1, or at least about 3.2, or at least about 3.3, or at least about 3.4, and so on. Non-limiting examples of suitable second materials include organic materials other than the organic material used to form the base region, air, and other dielectric materials. The photonic crystal of the present invention reflects at least a portion of electromagnetic energy falling within a first range of frequencies and transmits at least a portion of electromagnetic energy falling within a second range of frequencies that is different from the first range of frequencies.

Although the invention has been described in detail with particular reference to certain embodiments detailed herein, other embodiments can achieve the same results. Variations and modifications of the present invention will be obvious to those skilled in the art, and the present invention is intended to cover in the appended claims all such modifications and equivalents.

The invention claimed is:

1. A photonic crystal comprising:
a base region comprising at least one organic material having a refractive index of at least about 2.3 for electromagnetic energy having a wavelength of about 700 nm; and
a plurality of secondary regions formed in the base region, the secondary regions comprising a second material,
wherein the photonic crystal reflects one or more frequencies within a first range of frequencies and transmits one or more frequencies within a second range of frequencies, such that said first range of frequencies is different from, and outside of, said second range of frequencies.

2. The photonic crystal according to claim 1, wherein the organic material has a refractive index of at least about 2.4 for electromagnetic energy having a wavelength of about 700 nm.

3. The photonic crystal according to claim 1, wherein the organic material has a refractive index of at least about 2.5 for electromagnetic energy having a wavelength of about 700 nm.

4. The photonic crystal according to claim 1, wherein the organic material has a refractive index of at least about 2.6 for electromagnetic energy having a wavelength of about 700 nm.

5. The photonic crystal according to claim 1, wherein the organic material has a refractive index of at least about 2.7 for electromagnetic energy having a wavelength of about 700 nm.

6. The photonic crystal according to claim 1, wherein the organic material has a refractive index of at least about 2.8 for electromagnetic energy having a wavelength of about 700 nm.

7. The photonic crystal according to claim 1, wherein the organic material has a refractive index of at least about 2.9 for electromagnetic energy having a wavelength of about 700 nm.

8. The photonic crystal according to claim 1, wherein the organic material has a refractive index of at least about 3.0 for electromagnetic energy having a wavelength of about 700 nm.

9. The photonic crystal according to claim 1, wherein the organic material is selected from one or more polythiophene polymers, polypyrrole polymers, polyfuran polymers, or copolymers of these polymers.

10. The photonic crystal according to claim 1, wherein the second material is air.

11. The photonic crystal according to claim 1, wherein the ratio of the refractive index of the organic material to a refractive index of the second material is at least about 2.3 for electromagnetic energy having a wavelength of about 700 nm.

* * * * *